W. R. CLAYTON.
DESICCATING APPARATUS.
APPLICATION FILED DEC. 2, 1915.
1,215,346.
Patented Feb. 13, 1917.
2 SHEETS—SHEET 1.
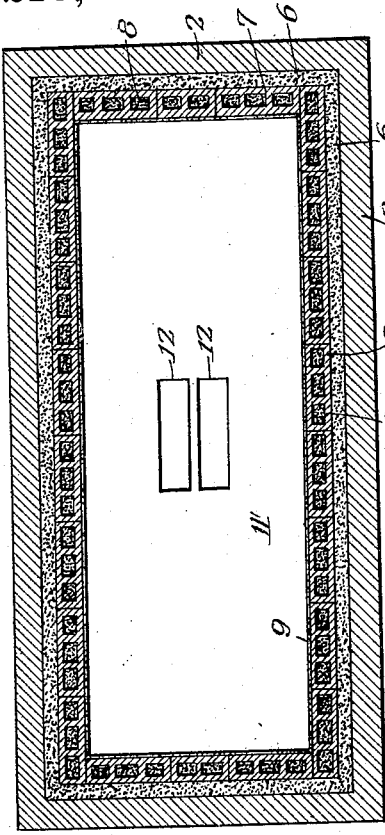
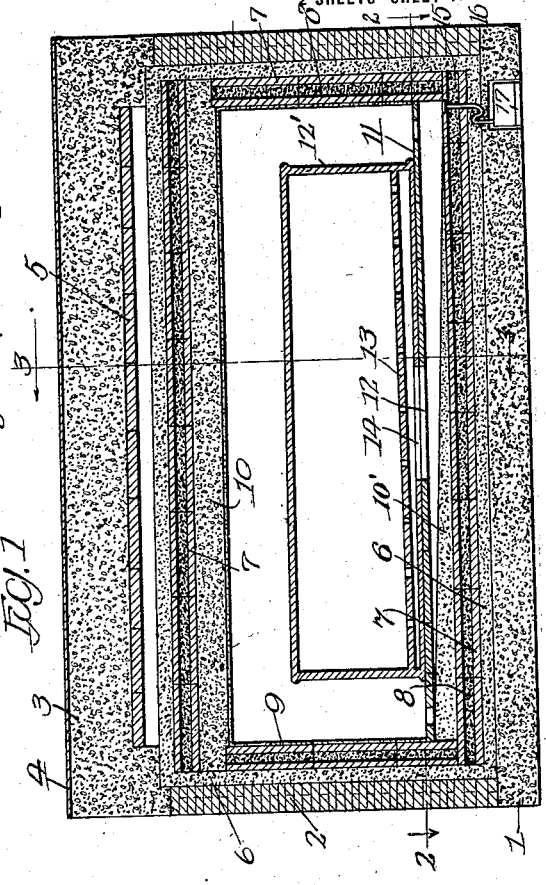
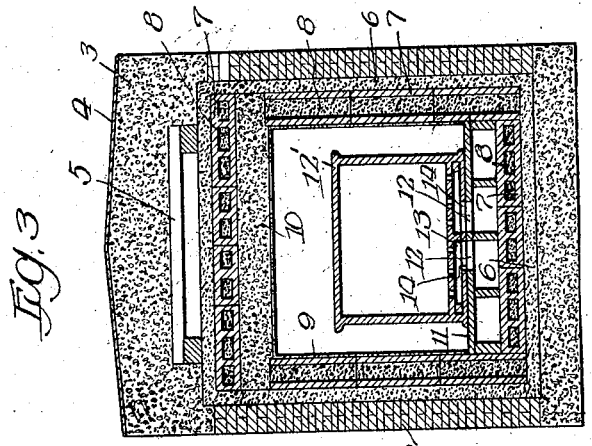
Witnesses:
Inventor
William R. Clayton W. R. CLAYTON.
DESICCATING APPARATUS.
APPLICATION FILED DEC. 2, 1915.
1,215,346.
Patented Feb. 13, 1917.
2 SHEETS—SHEET 2.
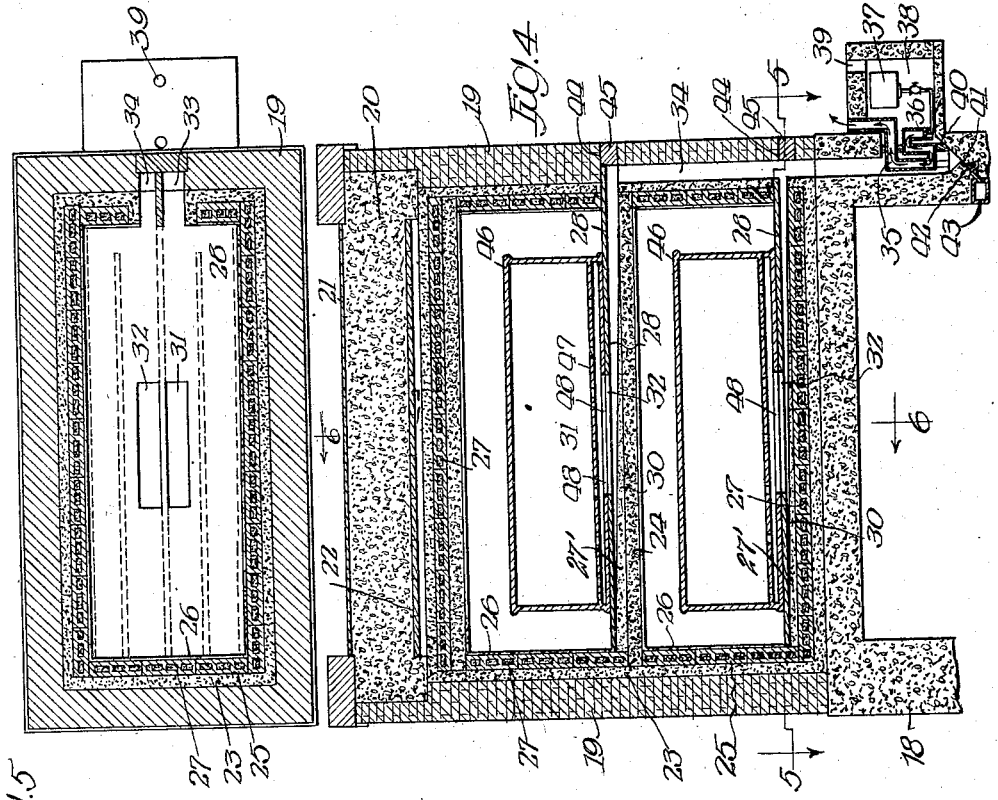
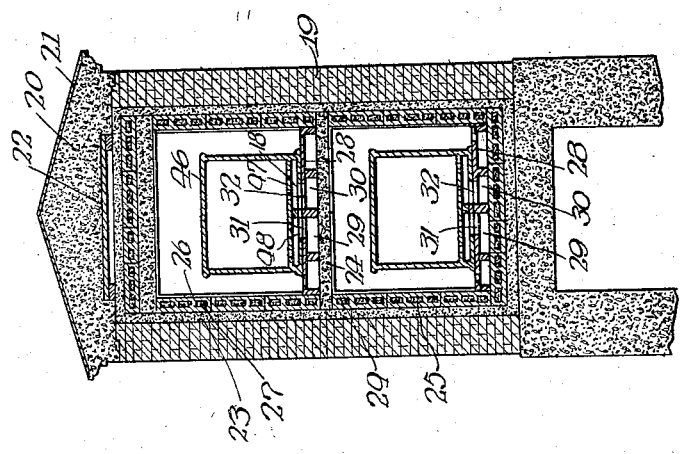

UNITED STATES PATENT OFFICE.

WILLIAM R. CLAYTON, OF EVANSTON, ILLINOIS.

DESICCATING APPARATUS.

1,215,346.  Specification of Letters Patent.  Patented Feb. 13, 1917.

Application filed December 2, 1915. Serial No. 64,669.

*To all whom it may concern:*

Be it known that I, WILLIAM R. CLAYTON, a citizen of the United States, residing at Evanston, in the county of Cook and State of Illinois, have invented certain new and useful Improvements in Desiccating Apparatus, of which the following is a specification.

This invention relates in general to the art of desiccating and preserving organic bodies and more particularly to structures adapted for use in connection with the method of preservation described in my copending application, Serial No. 646,668, filed December 2, 1915.

It is the object of my invention to provide structures of simple and inexpensive construction adapted for use in carrying out the method described in my above-mentioned application, which structures may be under or above the ground as appears to be desirable.

Further objects and advantages of my invention will be apparent as it is better understood by reference to the following specification when read in connection with the accompanying drawing illustrating preferred embodiments thereof in which—

Figure 1 is a vertical longitudinal section through a structure particularly adapted for underground use;

Fig. 2 is a horizontal section on the line 2—2 of Fig. 1;

Fig. 3 is a vertical section on the line 3—3 of Fig. 1;

Fig. 4 is a vertical longitudinal section illustrating a structure adapted for use above the ground and provided with a plurality of compartments;

Fig. 5 is a horizontal section on the line 5—5 of Fig. 4, and

Fig. 6 is a vertical section on the line 6—6 of Fig. 4.

Referring to Figs. 1 to 3 of the drawings, 1 indicates a suitable base, preferably formed of concrete, 2 the walls, which may be of brick or any other permanent form of construction, and 3 the top which is preferably of concrete. A layer of waterproofing material 4 is disposed above the top 3 to prevent the passage of moisture therethrough. The false work 5 is employed during the construction of the top 3 and remains in position when the structure is completed.

The inner walls of the chamber thus formed are coated with a layer 6 of waterproof cement. Adjacent the layer 6 within the chamber, inner walls, consisting of hollow porous tile 7, are erected, the hollows of the tile being filled with freshly calcined gypsum 8. A coating 9 of hard plaster is disposed over the faces of the tile 7 to finish and give a pleasing appearance to the interior of the chamber. As an additional precaution a layer 10 of waterproof cement is disposed beneath the layer of tile 7 forming the roof of the chamber.

A false floor 11, preferably of wood, is constructed within the chamber and provided with openings 12, allowing communication between the spaces above and below the floor 11. A layer of calcined gypsum 10' is disposed beneath the floor 11. The casket 12' is also preferably provided with a false floor 13 and with openings 14 in the bottom thereof adapted to register with the openings 12 in the floor 11. From one end of the chamber a pipe 15, provided with a trap 16, leads to a drain 17, thus providing for any surplus moisture which may accumulate within the chamber.

I have discovered that calcined gypsum, particularly when freshly calcined, has a strong affinity for water and is, therefore, a splendid desiccating material for organic bodies. Furthermore, this material has the advantage that the mixture is absorbed and combines with the gypsum as water of crystallization, in which form it is permanently retained. It will be understood further that where calcined gypsum is placed in a sealed chamber with the body to be desiccated no moisture as such will accumulate in the chamber so long as the supply of gypsum is sufficient to absorb it. In carrying out my method I place the body, which is preferably embalmed although this is not essential, in the casket 12' and position the casket within the chamber with the openings 14 in the bottom thereof registering with the openings 12. The chamber is sealed and the desiccating action of the calcined gypsum, which has previously been disposed within the openings in the hollow porous tile forming the walls of the chamber and beneath the false floor 11, commences at once and continues so long as moisture exists in the body to withdraw and combine with the moisture.

It will be understood from the foregoing that I have provided an extremely simple and inexpensive burial chamber, adapted particularly for subterranean use, which is moisture-proof and in which the body, owing to the provision of desiccating material within the chamber, will be permanently preserved in a desiccated condition. No moisture can reach the body from the exterior of the chamber and the moisture of the body itself is entirely taken care of by the desiccating material. Inasmuch as mold and putrefactive ferments can not exist in the absence of moisture it follows that the body will remain permanently in its desiccated condition without decay and hence the soil about the place of burial will not be contaminated, thus removing one of the most dangerous conditions now surrounding the usual method of disposal of the dead.

In Figs. 4 to 6 of the drawing I have illustrated a modified form of the structure just described which is adapted particularly for use above the ground and where it is desirable to provide two or more chambers to receive separate bodies. The structure is further provided with auxiliary means whereby the desiccating process may be hastened.

Referring to Figs. 4 to 6, a base 18 is illustrated which forms a foundation for the structure and preferably extends to a point somewhat above the grade of the surrounding earth. Upon the base 18 the side and end walls 19 are erected, preferably of brick, although any suitable structural material which is permanent in nature may be employed. A top 20, forming a roof, is disposed above the walls 19 and may be of concrete and provided with a waterproof covering 21. The top 20 is supported during the course of erection by false work 22 which may remain permanently in position. The interior of the structure thus formed is coated with a layer 23 of waterproof cement and in the present instance the interior is divided into two chambers by a partition 24, also of waterproof cement. Within the separate chambers walls composed of hollow porous tile 25 are erected adjacent the waterproof cement coating 23 and a layer of hard plaster 26 is applied to the walls of the chamber to provide a finish of pleasing appearance.

The openings in the tile 25 are filled with calcined gypsum 27, preferably freshly calcined, and false floors 28 are erected in the separate chambers, beneath which floors layers of calcined gypsum 27' are disposed. The floors are constructed of wood or other suitable material to provide ducts 29 and 30 which, through suitable openings 31 and 32 in the false floors 28, communicate with the interior of the chambers. At the rear end of the structure vertical ducts 33 and 34 are formed in the end wall 19 connecting with the ducts 29 and 30, respectively, and extending downwardly into the base 18. At the lower end of the duct 34 a heating flue 35 is provided in which a burner 36 is disposed and supplied with fuel from any suitable source such for example as a gasolene tank 37 disposed in the pit 38. The flue 35 is open to the atmosphere so that the products of combustion may escape and air is supplied to the pit 38 and the burner 36 through an opening 39. A plate 40 prevents access of air from the pit to the ducts 33 and 34. From the base of the ducts 33 and 34 a pipe 41, provided with a seal 42, leads to a drain 43 to care for any moisture or surplus gases which may accumulate in the ducts 33 and 34. Hand holes 44 are provided in the rear wall 19 opposite the ducts 29 and 30, the holes 44 being normally sealed by plugs 45.

The structure last described may be used in carrying out the method of desiccation previously described in connection with Figs. 1 to 3, but preferably the operation is hastened by a circulation of the atmosphere within the chamber and this may be accomplished in a variety of ways such for example as by the provision of the heating flue 35 in the vertical duct 34, which causes the gases to rise, pass through the duct 30 and upwardly into the chamber and the casket 46, which is provided with a false floor 47 and openings 48 in its bottom to register with the openings 31 and 32 in the false floor 28. The gases pass from the casket into the duct 27 and thence downwardly through the duct 33, after which they again pass over the heating flue 35. The heating of the atmosphere has an additional effect in causing the atmosphere to become capable of carrying a greater proportion of moisture and serves to hasten the desiccation of the body. Preferably the temperature of the atmosphere is raised to a point not above that of the blood of living bodies.

It will be obvious that various changes may be made in the form, construction and arrangement of the parts without departing from the spirit and scope of the invention or sacrificing any of its material advantages, the forms hereinbefore described being merely preferred embodiments thereof.

I claim:

1. A desiccating device, comprising outer walls forming a sealed chamber, and inner walls consisting of hollow porous tile, the hollows of said tile containing a desiccating material.

2. A desiccating device comprising outer walls forming a sealed chamber, inner walls consisting of hollow porous tile, the hollows of said tile containing a desiccating material, and a layer of waterproof material between said outer and inner walls.

3. A desiccating device comprising outer walls forming a sealed chamber, inner walls consisting of hollow porous tile, the hollows of said tile containing a desiccating material, a layer of waterproof cement between said outer and inner walls, and a false floor in said chamber above the bottom layer of tile.

4. A desiccating device comprising outer walls forming a sealed chamber, inner walls consisting of hollow porous tile, the hollows of said tile containing a desiccating material, a layer of waterproof cement between said inner and outer walls, and a trapped drain connected to said chamber to allow egress of liquids and gases.

5. A desiccating device, comprising outer walls forming a sealed chamber, and inner walls consisting of hollow porous tile, the hollows of said tile being filled with calcined gypsum.

6. A desiccating device, comprising outer walls forming a sealed chamber, inner walls consisting of hollow porous tile, the hollows of said tile being filled with calcined gypsum, and a layer of waterproof cement between said inner and outer walls.

7. A desiccating device, comprising outer walls forming a sealed chamber, inner walls adapted to support a quantity of desiccating material within said chamber, and means for causing a circulation of the atmosphere within said chamber.

8. A desiccating device, comprising outer walls forming a closed chamber, inner walls consisting of hollow porous tile, the hollows of said tile containing a desiccating material, and means for causing a circulation of the atmosphere within said chamber.

9. A desiccating device, comprising outer walls forming a sealed chamber, inner walls consisting of hollow porous tile, the hollows of said tile being filled with calcined gypsum, a layer of waterproof cement between said inner and outer walls, and means for causing a circulation of the atmosphere within said chamber.

10. A desiccating device, comprising outer walls forming a sealed chamber, inner walls adapted to support a quantity of desiccating material, a false floor in said chamber, means to separate the space beneath said floor into ducts, openings in said floor communicating with said ducts, connecting ducts in one of said outer walls, and means for causing a circulation of the atmosphere of said chamber through said ducts.

11. A desiccating device, comprising outer walls forming a sealed chamber, inner walls adapted to support a quantity of desiccating material, a false floor in said chamber, means to separate the space beneath said floor into ducts, openings in said floor communicating with said ducts, connecting ducts in one of said outer walls, and heating means in one of the ducts in said outer wall.

12. A desiccating device, comprising outer walls forming a sealed chamber, inner walls adapted to support a quantity of desiccating material, a false floor in said chamber, means to separate the space beneath said floor into ducts, openings in said floor communicating with said ducts, connecting ducts in one of said outer walls, a heating flue in one of the ducts in said outer wall, a burner in said flue, and means for supplying combustible material thereto.

13. A desiccating device, comprising outer walls forming a sealed chamber, inner walls adapted to support a quantity of desiccating material within said chamber, and means for heating the atmosphere within said chamber.

14. A desiccating device, comprising outer walls forming a sealed chamber, inner walls consisting of hollow porous tile, the hollows of said tile containing a desiccating material, and means for heating the atmosphere of said chamber.

15. A desiccating device, comprising outer walls forming a sealed chamber, inner walls consisting of hollow porous tile, the hollows of said tile being filled with calcined gypsum, a layer of waterproofing material between said inner and outer walls, and means for heating the atmosphere of said chamber.

16. A desiccating device, comprising outer walls forming a sealed chamber, inner walls consisting of hollow porous tile, the hollows of said tile being filled with calcined gypsum, and means for causing a circulation of the atmosphere within said chamber.

17. A desiccating device comprising outer walls forming a sealed chamber, inner walls consisting of hollow porous tile, the hollows of said tile being filled with calcined gypsum, a false bottom in said chamber, means to separate the space beneath said flue into ducts, openings in said floor communicating with said ducts, a casket having openings in its bottom corresponding to the openings in said floor, vertical connecting ducts in one of said outer walls, and means for causing a circulation of the atmosphere of said chamber through said ducts and casket.

18. A desiccating device, comprising outer walls forming a sealed chamber, inner walls consisting of hollow porous tile, the hollows of said tile being filled with calcined gypsum, a false bottom in said chamber, means to separate the space beneath said flue into ducts, openings in said floor communicating with said ducts, a casket having openings in its bottom corresponding to the openings in said floor, vertical connecting ducts in one of said outer walls, and heating means in one of the ducts in said outer wall.

19. A desiccating device, comprising outer walls forming a sealed chamber, inner walls consisting of hollow porous tile, the hollows of said tile being filled with calcined gypsum, a false bottom in said chamber, means to separate the space beneath said flue into ducts, openings in said floor communicating with said ducts, a casket having openings in its bottom corresponding to the openings in said floor, vertical connecting ducts in one of said outer walls, a heating flue in one of the ducts in said outer walls, a burner in said flue, and means for supplying combustible material thereto.

20. A desiccating device, comprising an air and water-proof container provided with a false floor, and a quantity of desiccating material within said container.

21. A desiccating device comprising an air and waterproof container, a false floor therein, a closed casket supported on said floor, an opening in the bottom of said casket, a registering opening in said floor and a quantity of desiccating material disposed beneath said floor.

WILLIAM R. CLAYTON.

Witnesses:
ERNEST H. MERCHANT,
W. T. WESTERBERG.

Copies of this patent may be obtained for five cents each, by addressing the "Commissioner of Patents Washington, D. C."